US012723445B2

(12) United States Patent
Handke

(10) Patent No.: US 12,723,445 B2
(45) Date of Patent: Sep. 1, 2026

(54) MOTOR VEHICLE LOCKING DEVICE

(71) Applicant: KIEKERT AKTIENGESELLSCHAFT, Heiligenhaus (DE)

(72) Inventor: Armin Handke, Duisburg (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 179 days.

(21) Appl. No.: 18/715,295

(22) PCT Filed: Dec. 1, 2022

(86) PCT No.: PCT/EP2022/084109
§ 371 (c)(1),
(2) Date: May 31, 2024

(87) PCT Pub. No.: WO2023/110442
PCT Pub. Date: Jun. 22, 2023

(65) Prior Publication Data
US 2025/0027347 A1 Jan. 23, 2025

(30) Foreign Application Priority Data
Dec. 14, 2021 (DE) ..................... 10 2021 133 115.3

(51) Int. Cl.
*E05B 81/46* (2014.01)
*E05B 81/04* (2014.01)
(Continued)

(52) U.S. Cl.
CPC .............. *E05B 81/46* (2013.01); *E05B 81/04* (2013.01); *E05B 81/14* (2013.01); *E05B 81/64* (2013.01); *E05B 85/26* (2013.01)

(58) Field of Classification Search
CPC .......... E05B 81/46; E05B 81/04; E05B 81/14; E05B 81/64; E05B 85/26
See application file for complete search history.

(56) References Cited

U.S. PATENT DOCUMENTS 3,547,476 A * 12/1970 Nockemann .......... E05B 85/045 292/216
4,886,307 A * 12/1989 Ruckert .............. E05B 17/0025 292/201
(Continued)

FOREIGN PATENT DOCUMENTS

DE 202012003171 U1 7/2013
DE 102017106707 A1 10/2018
(Continued)

OTHER PUBLICATIONS

International Search Report mailed Feb. 15, 2023, for priority International Application No. PCT/EP2022/084109.

*Primary Examiner* — Mark A Williams
(74) *Attorney, Agent, or Firm* — Renner, Otto, Boisselle & Sklar, LLP

(57) ABSTRACT

A motor vehicle locking device is equipped with a coupling arrangement consisting essentially of an actuating lever and a release lever that can be coupled releasably thereto. The actuating lever and the release lever can be coupled to one another starting from an uncoupled basic position by a two-stroke actuation of the actuating lever. An accumulator lever storing the first stroke of the operating lever is additionally provided so that, during its second stroke, the operating lever can act upon the release lever that follows the accumulator lever. According to the invention, a safety lever is provided as a complement, which suppresses in its "secured" position a subsequent movement of the release
(Continued)

lever during the second stroke of the actuating lever and permits said movement in its “unsecured” position.

13 Claims, 14 Drawing Sheets

(51) Int. Cl.
*E05B 81/14* (2014.01)
*E05B 81/64* (2014.01)
*E05B 85/26* (2014.01)

(56) References Cited

U.S. PATENT DOCUMENTS

| | | | | | |
|---|---|---|---|---|---|
| 6,367,296 | B1 * | 4/2002 | Dupont | E05B 81/16 292/201 |
| 2003/0234544 | A1 * | 12/2003 | Jankowski | E05B 77/06 292/220 |
| 2011/0016794 | A1 * | 1/2011 | Nishikibe | E05B 81/20 49/359 |
| 2011/0278867 | A1 * | 11/2011 | Watanabe | E05B 81/06 292/341.16 |
| 2015/0233452 | A1 * | 8/2015 | Martinez | F16H 19/04 74/89.14 |
| 2015/0345187 | A1 * | 12/2015 | Kwon | E05B 83/24 292/44 |
| 2016/0153217 | A1 * | 6/2016 | Mazal | E05B 85/243 292/200 |
| 2018/0080262 | A1 * | 3/2018 | Takagi | E05B 85/02 |

FOREIGN PATENT DOCUMENTS

| | | | |
|---|---|---|---|
| DE | 102017124524 | A1 | 4/2019 |
| DE | 102020113992 | A1 | 12/2021 |

* cited by examiner

MOTOR VEHICLE LOCKING DEVICE

This application is a national phase of International Patent Application No. PCT/EP2022/084109 filed Dec. 1, 2022, which claims priority to German Patent Application No. 10 2021 133 115.3 filed Dec. 14, 2021, each of which is hereby incorporated herein by reference in its entirety.

FIELD OF DISCLOSURE

The invention relates to a motor vehicle locking device, with a clutch arrangement which essentially comprises an actuating lever and a release lever which can be coupled in a releasable manner to it, wherein the actuating lever and the release lever, starting from a disengaged basic position, can be coupled to one another by a two-stroke action upon the actuating lever, and wherein a accumulator lever which stores the first stroke of the actuating lever is provided so that the actuating lever can act upon the release lever following the accumulator lever during its second stroke.

BACKGROUND OF DISCLOSURE

Motor vehicle locking devices with coupling arrangements essentially consisting of an actuating lever and a release lever that can be detachably coupled with it are often used as a motor vehicle locking device in connection with the realization of an internal actuating lever chain in motor vehicle locks. Of course, this is not restrictive. In any case, such internal operating lever chains are often acted upon in two-stroke mode for safety reasons. The first stroke of the operating lever is used to unlock the vehicle lock and, in particular, the vehicle door lock. In the second stroke, a previously closed locking mechanism provided at the end of the actuating lever chain is then opened. This prevents unintentional door openings, which increases security.

In the generic prior art according to DE 10 2020 113 992 A1, the design for this purpose is such that the first stroke of the actuating lever is stored with the aid of the accumulator lever. As a result, the actuating lever can act upon the release lever during its second stroke. A latching element is provided for this purpose, with the aid of which a releasable storage position of the accumulator lever can be realized. In this way, a motor vehicle locking device is made available with little technological effort. This has proven to be fundamentally successful.

With such interior operating lever chains, a so-called child safety function can often also be implemented, particularly on rear vehicle side doors. This corresponds to the internal actuation lever chain being set to either active or inactive. The latter state of an ineffective internal operating lever chain corresponds to the "childproof" position whereas the "childproof" state is observed when the internal operating lever chain is effective. Especially in the last-mentioned functional position "childproof", the locking mechanism is regularly operated in such a way that when the actuating lever is acted upon, the locking mechanism opens with the first stroke.

In other words, there are currently no convincing approaches in the state of the art to combine the described two-stroke actuation with a safety function in such a way that the usual two-stroke actuation is still required to open the locking mechanism in the unlocked state. The lack of this functionality may lead to confusion or irritation among users. The invention as a whole seeks to remedy this.

SUMMARY OF DISCLOSURE

The invention is based on the technical problem of further developing such a motor vehicle locking device in such a way that the usual two-stroke operation can be retained even if a locking function or locking unit is additionally implemented.

To solve this technical problem, the invention proposes, based on a generic motor vehicle locking device within the scope of the invention, that an additional safety lever is provided which, in its "secured" position, prevents the subsequent movement of the release lever during the second stroke of the actuating lever and, in its "unlocked" position, permits it.

Within the scope of the invention, therefore, the safety lever is also realized in addition to the clutch arrangement essentially comprising the actuating lever and the releasable release lever and the accumulator lever. The locking lever can be a component of a locking unit. This safety unit may not necessarily be restricted to a child safety unit. In principle, however, the security unit can also be a locking unit, an anti-theft unit or a combination of both.

The design within the scope of the invention is such that the safety lever in its "secured" position prevents the subsequent movement of the release lever during the second stroke of the actuating lever. This means that in the "secured" position of the safety lever, the actuating lever continues to perform the first stroke unchanged. During this first stroke, however, the accumulator lever does not assume a storage position in the "secured" position of the locking lever, which will be explained in more detail below. As a result, the release lever cannot follow the accumulator lever on the second stroke of the actuating lever and open the locking mechanism accordingly. According to the invention, such a subsequent movement of the release lever during the second stroke of the actuating lever is only possible when the safety lever assumes its "unlocked" position.

Consequently, even the "unlocked" position of the safety lever within the scope of the invention still requires that the accumulator lever initially moves to its storage position on the first stroke of the actuating lever. This is permitted explicitly in the "unlocked" position of the safety lever and is assumed at least temporarily. As a result, in this "unlocked" position of the locking lever, the second stroke of the actuating lever means that the release lever can now move in line with the accumulator lever and therefore also with the actuating lever, so that the previously closed locking mechanism is opened via the release lever. In itself, this is unusual, because normally in the "unlocked" position of the locking lever and hence an associated locking unit, a first and single stroke of the actuating lever immediately opens the locking mechanism.

According to the invention, however, the described two-stroke actuation is still required for this purpose. This does not change anything for an operator, whether they act upon, for example, a front motor vehicle side door with the described two-stroke operation and without an additional safety lever within the meaning of the invention, or the rear motor vehicle side door. This means that the operation has remained the same with the addition of a childproofing function, for example.

In all these cases, after the two-stroke actuation on the part of the actuating lever, the power pull closing device is reset to its initial position so that confusion of the user in this respect is avoided as well. In addition, the safety lever can advantageously be acted upon manually and/or by an electric motor so that, for example, the vehicle locking devices or vehicle door locks on the rear vehicle side doors can be easily synchronized. These are the main advantages.

In general, the further design is such that the locking lever interacts with a latching element, which is set up to realize the previously described and releasable storage position of the accumulator lever. For this purpose, the locking lever usually has a driving contour. With the aid of the driving contour, the locking element in question can be acted upon by the locking lever. In fact, the locking lever is usually operated in such a way that the locking element can be transferred from a locking position that allows the storage position of the accumulator lever to a release position that prevents the storage position and vice versa via the driving contour.

In order to move the safety lever into its two positions "locked" and "unlocked" accordingly, a stop contour is also usually provided. The stop contour of the locking lever is designed to interact with a handle and/or an electric motor drive. In this way, the safety lever can be easily moved to the desired "locked" or "unlocked" functional position, for example manually using the handle or by remote control using the electric motor drive, or both.

As already explained, the "secured" position of the safety lever corresponds to the fact that the release lever cannot follow the second stroke of the actuating lever, meaning that the closed locking mechanism is not opened. In contrast, the "unlocked" position of the safety lever corresponds to the release lever following the stroke of the actuating lever on the second stroke of the actuating lever and opening the locking mechanism accordingly. For this purpose, the acted upon release lever usually works on a pawl as part of the locking mechanism consisting of a pawl and catch. As the pawl is in latching engagement with the catch when the locking mechanism is closed, an opening movement on the part of the release lever causes the pawl to be lifted from its latching engagement with the catch. This is followed by the spring-assisted opening of the catch and the release of a previously trapped locking bolt. The associated vehicle door and the relevant vehicle lock or vehicle door lock can be opened.

As a rule, a sensor that senses the safety lever is provided. This sensor can be used to query the respective position and setting of the safety lever in terms of "unlocked" or "secured." In the simplest case, the sensor is a switch that is acted upon via a contour on the safety lever, for example.

According to another advantageous embodiment with particular significance, a shift lever is realized in addition to the accumulator lever. The shift lever is generally coupled elastically to the accumulator lever via a spring. This means that when the accumulator lever assumes the storage position, the spring that couples the two levers elastically ensures that the shift lever ultimately follows the accumulator lever, which remains in its storage position temporarily. This means that during the second stroke of the actuating lever, the actuating lever follows the accumulator lever in the storage position, allowing the actuating lever to act upon the shift lever. Furthermore, since in this position the shift lever usually rests against the release lever with a stop contour interacting with the release lever, the second stroke of the actuating lever is transferred to the release lever, which opens the locking mechanism as required—as described. For this purpose, the shift lever, the accumulator lever and the release lever are usually and advantageously mounted so that they are axially aligned and rotatable. This means that the three levers referred to above have a common axis for their rotary movement.

As a result, a motor vehicle locking device is provided which still requires a two-stroke actuation in order to open the locking mechanism, even when the additionally provided locking lever and consequently a corresponding locking unit assumes its "unlocked" position. As a result, there is no difference for the operator in terms of the action upon the motor vehicle locking device according to the invention as to whether the safety lever is additionally realized or not. These are the main advantages.

BRIEF DESCRIPTION OF DRAWINGS

The invention is explained in greater detail below with reference to drawings which show only one exemplary embodiment. In the drawings.

DETAILED DESCRIPTION

Figure 1:
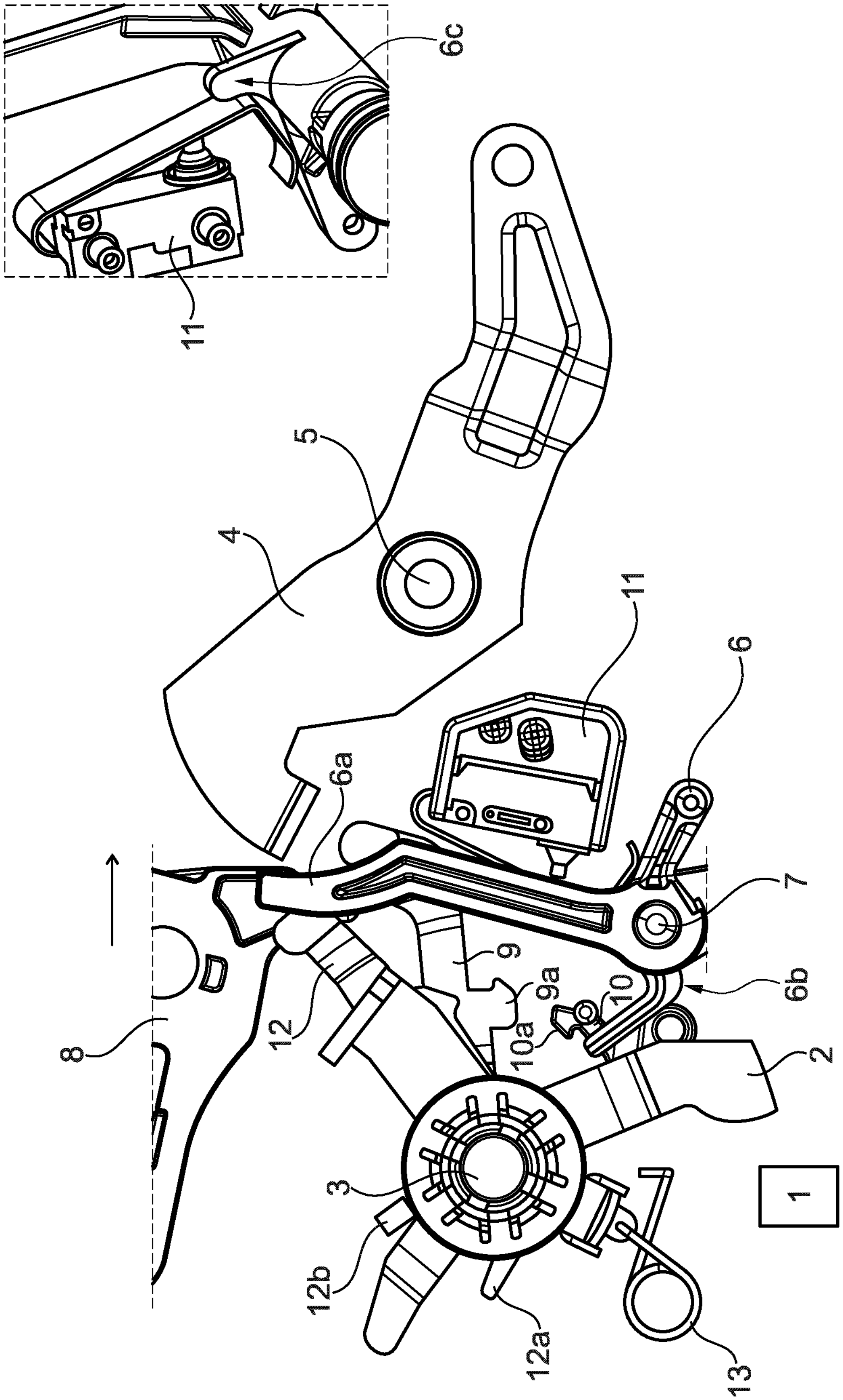
FIGS. 1 to 6 show the motor vehicle locking device according to the invention with the safety lever moved to its "secured" position and FIGS. 7 to 14 show the relevant vehicle locking device with the safety lever remaining in the "unlocked" position.
Figure 14:
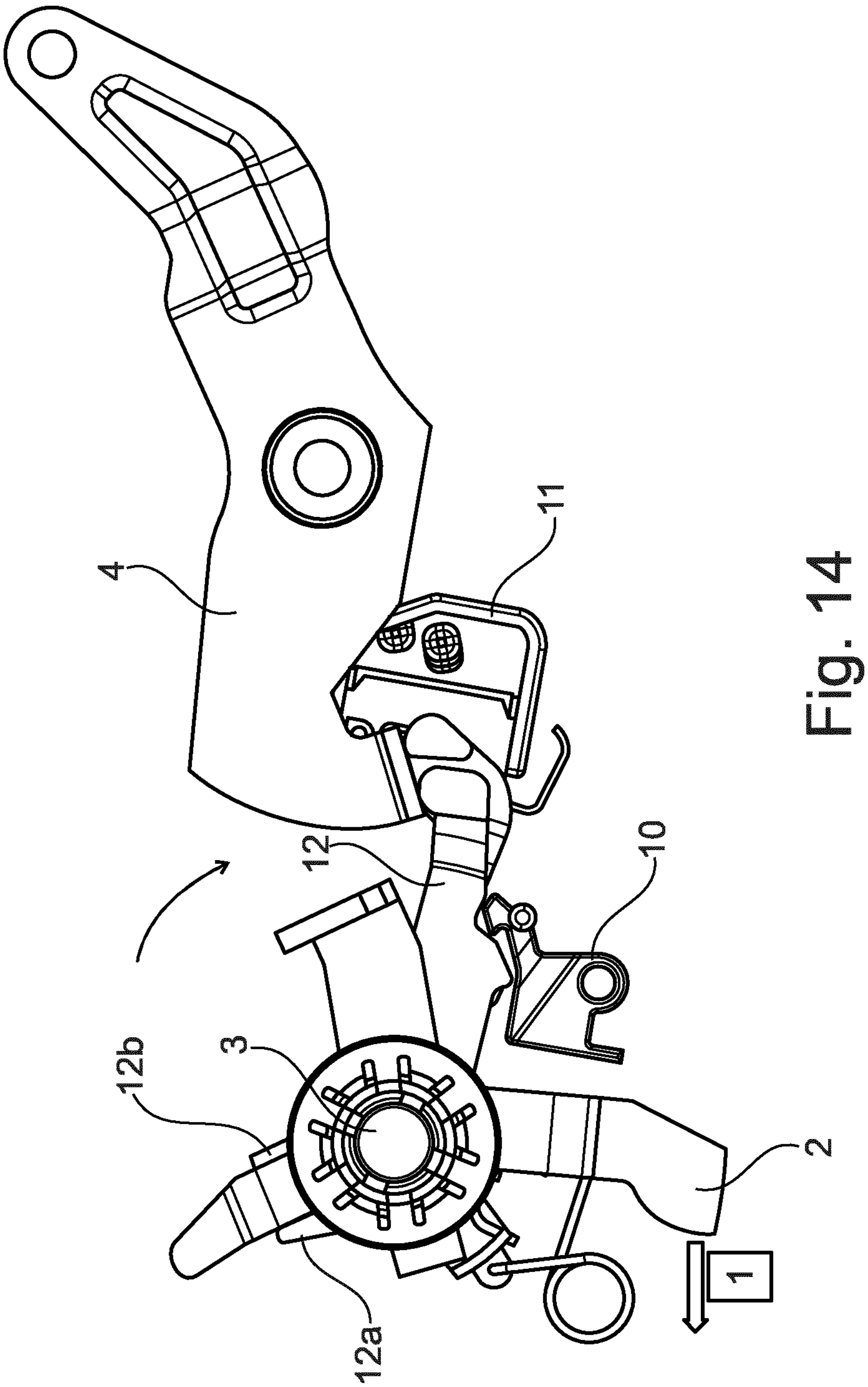

The figures show a motor vehicle locking device which first of all has a locking mechanism 1 consisting essentially of a catch and pawl. In FIG. 1, the locking mechanism 1 is in a closed state, in which the pawl engages in the catch. In contrast, FIG. 14 shows an opening process of the locking mechanism 1, which corresponds to the fact that the locking mechanism 1 is acted upon with the aid of a release lever 2. This requires the release lever 2 to perform a clockwise swivel movement around its axis 3 as can be seen by comparing FIGS. 1 and 14.

The basic structure of the vehicle locking device includes a clutch arrangement 2, 4, which consists of the aforementioned release lever 2 on the one hand and an actuating lever 4 on the other. For this purpose, the actuating lever 4 is mounted so that it can rotate about a further axis of rotation 5 that is separate from the axis 3. In addition, and importantly, a safety lever 6 is also provided, which is rotatably mounted about an axis 7 and can be acted upon by means of an electric motor drive 8. Rotational movements of the locking lever 6 about its axis 7 in a clockwise direction correspond to this, as can be seen by comparing FIGS. 1 and 2. This is accompanied by a change in the functional position of the locking lever 6. In FIGS. 1 and 7 and the subsequent FIGS. 8 to 14 (in which the safety lever 6 is not shown), this is in its "unlocked" position, whereas in FIGS. 2 to 6 the safety lever 6 is in its "secured" position.

Figure 2:
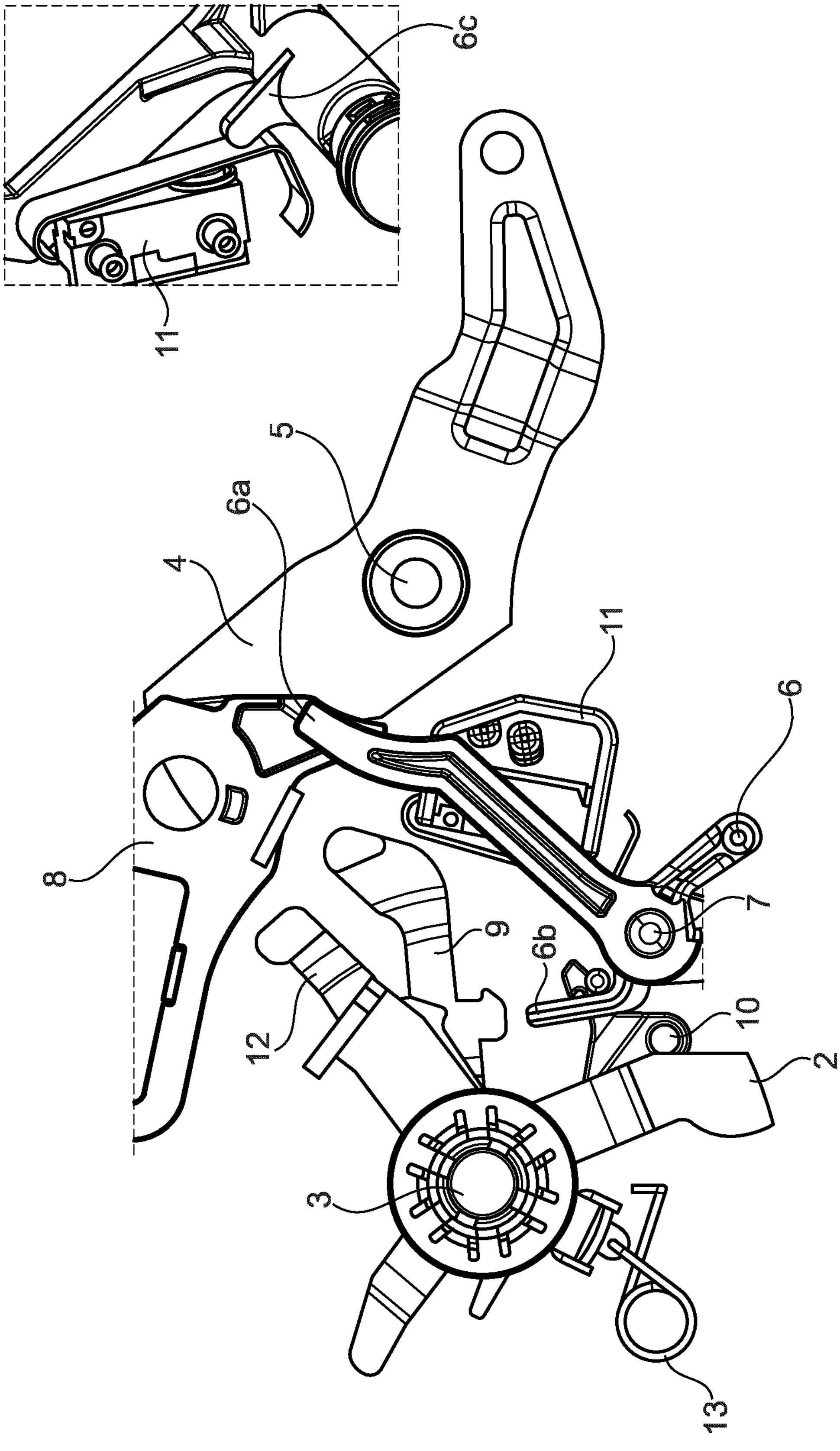

For this purpose, the locking lever 6 is equipped with a stop contour 6*a*, which interacts with the electric motor drive 8 or is acted upon by it. In fact, the transition from the "unlocked" position of the locking lever 6 according to FIG. 1 to the "secured" position as shown in FIG. 2 corresponds to the fact that the electric motor drive 8 performs a more or less pronounced linear movement and thus swivels the locking lever 6 clockwise about its axis 7 as desired via the stop contour 6*a*. As an alternative to the electromotive drive 8, the described pivoting movement of the locking lever 6 can also be performed manually via a handle by means of a corresponding interaction with the stop contour 6*a*, although this is not shown in detail.

In addition, a accumulator lever 9 can be seen, which can interact with an additional latching element 10. For this purpose, the accumulator lever 9 and the latching element 10 have corresponding and interlocking latching elements 9*a*, 10*a*. The latching elements 9*a*, 10*a* only interact in the event that the latching element 10 assumes its latching position shown in FIG. 1, so that the two latching elements 9*a*, 10*a* can interact with each other when the accumulator lever 9 is acted upon with the aid of the actuating lever 4, as can be seen in the transition from FIG. 1 to FIG. 9. This corresponds to the storage position of the accumulator lever 9 shown in FIG. 9.

If, on the other hand, the latching element 10 assumes its release position, as shown in FIG. 2, there is no latching interaction between the two latching elements 9*a*, 10*a*. In order to move the latching element 10 from its latching position as shown in FIG. 1 to the release position, for example as shown in FIG. 2, the latching element 10 is acted upon with the aid of the locking lever 6. For this purpose, the locking lever 6 has a driving contour 6*b*, which is used to act upon the latching element 10.

Finally, the figures also show a sensor 11 which, according to the exemplary embodiment and not in a restrictive sense, is a switch. The sensor 11 or switch may be connected to a control unit, not shown, which is not only set up to query the position of the locking lever 6 via the sensor 11, but also serves to control the electric motor drive 8. The position sensing of the safety lever 6 with the aid of the sensor or switch 11 is carried out in such a way that the safety lever 6 has a switching contour 6*c* shown in the section of FIG. 1, which acts on a spring belonging to the sensor or switch 11 and thus on the sensor or switch 11 when the safety lever 6 moves from its "unlocked" position as shown in FIG. 1 to the "secured" position as shown in FIG. 2, as can be seen from the respective sections there.

Of particular importance for the invention is the fact that the actuating lever 4 and the release lever 2 not only define the already described clutch arrangement 2, 4, but that the actuating lever 4 and the release lever 2, starting from a disengaged basic position shown in FIG. 1, can be coupled together by a two-stroke actuation of the actuating lever 2 to be described in detail below, as can be seen from FIGS. 13 and 14. The procedure is such that the accumulator lever 9, which stores the first stroke of the actuating lever 4, is provided first. In other words, the first stroke of the actuating lever 4 ensures that the accumulator lever 9 moves to its storage position, as shown in FIGS. 10 to 13. In this way, the actuating lever 4 can act upon the release lever 2 following the accumulator lever 9 during its second stroke, as can be seen in FIG. 14.

In accordance with the invention, the safety lever 9 is now additionally provided, which in its "secured" position shown in FIGS. 2 to 6 prevents the previously described subsequent movement of the release lever 2 during the second stroke of the actuating lever 4 and in its "unlocked" position permits it, as the sequence of figures in FIGS. 10 to 14 makes clear.

Of particular importance is the fact that in addition to the safety lever 6 and the accumulator lever 9, a shift lever 12 is also provided. The shift lever 12 is coupled to the accumulator lever 9 via a spring 13. In addition, the shift lever 12 has a stop contour 12*a* that interacts with the release lever 2. In addition, a further stop contour 12*b* is realized on the shift lever 12, which is described below. As soon as the stop contour 12*a* of the shift lever 12 comes into engagement with the release lever 2, as shown in the sequence of FIGS. 11 to 14, the release lever 2 can be pivoted clockwise about its axis 3 with the aid of the actuating lever 4 and is able to open the locking mechanism 1. It can be seen that, according to the exemplary embodiment, the shift lever 12, the accumulator lever 9 and finally the release lever 2 are mounted on the same axis as one another and can each be rotated about the common axis 3.

The mode of operation is as follows. In FIG. 1, the locking mechanism 1 assumes its closed state. The safety lever 6 is in the "unlocked" position. If, starting from FIG. 1, the electromotive drive 8 is acted upon in such a way that it performs a linear movement from left to right, the electromotive drive 8 ensures via the stop contour 6*a* on the locking lever 6 that the locking lever 6 is pivoted clockwise about its axis 7 during the transition from FIG. 1 to FIG. 2. As a result, the safety lever 6 actuates the sensor or switch 11 via its switching contour 6*c*, so that the safety lever 6 transmits the "secured" position to the control unit, not shown. As the locking lever 6 is pivoted clockwise around the axis 7 during this process, the driving contour 6*b* on the locking lever 6 also ensures that the locking element 10 also performs a clockwise pivoting movement during the transition from FIG. 1 to FIG. 2. As a result, the latching contour 10*a* on the latching element 10 cannot subsequently interact with the corresponding latching contour 9*a* on the accumulator lever 9.

Figure 3:
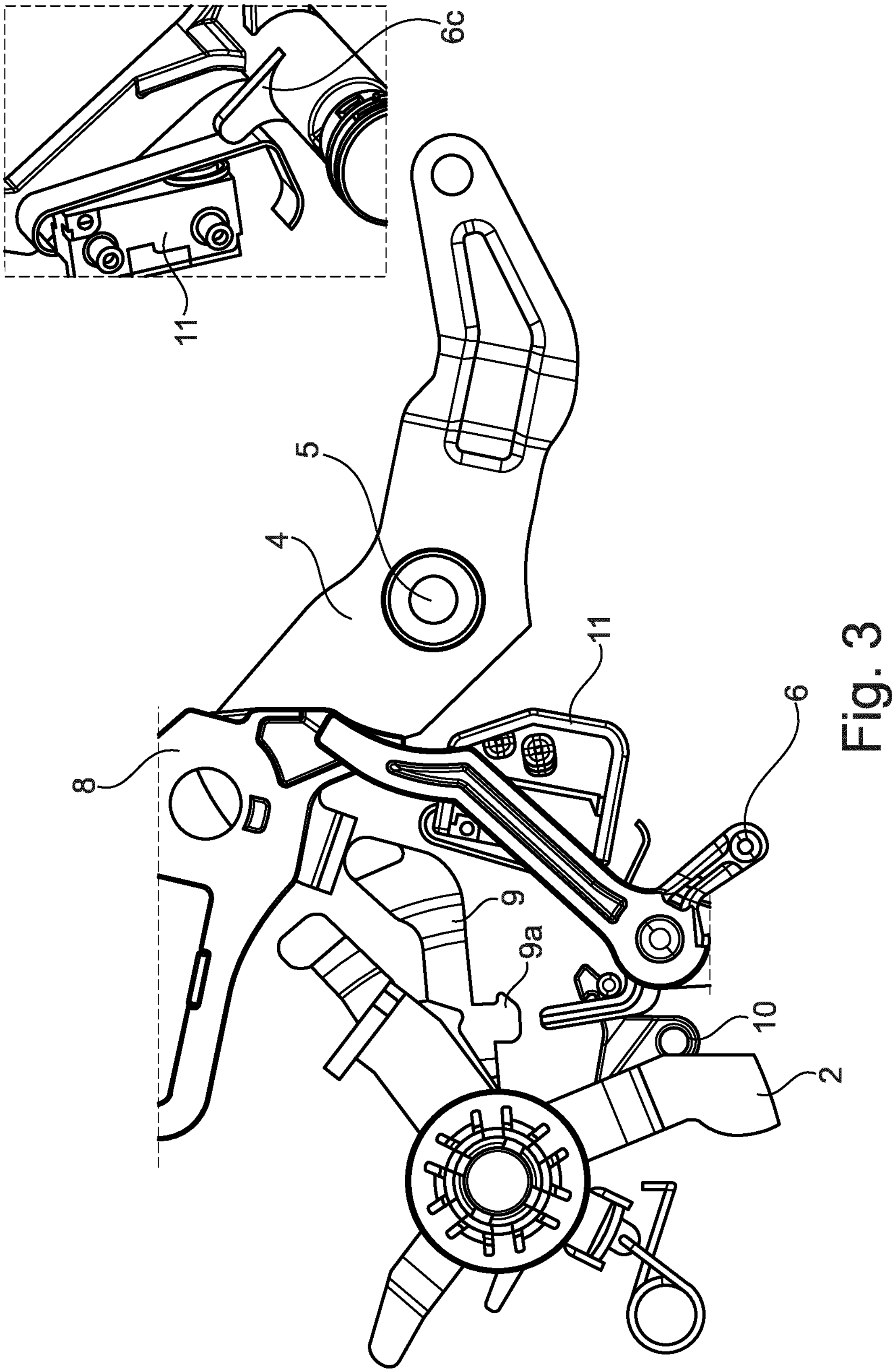

This becomes clear in the transition from FIG. 2 to FIG. 3. Here, the actuating lever 4 has been acted upon in such a way that it performs a counter-clockwise movement around its axis 5 during the transition from FIG. 2 to FIG. 3. This allows the actuating lever 4 to increasingly act upon the accumulator lever 9, as can be seen as this movement progresses from FIG. 3 to FIG. 4. During this swivel movement of the accumulator lever 9, the latching contours 9*a* and 10*a* on the latching element 10 on the one hand, and on the accumulator lever 9 on the other, do not interact with each other in the functional position shown in FIG. 4.

Figure 4:
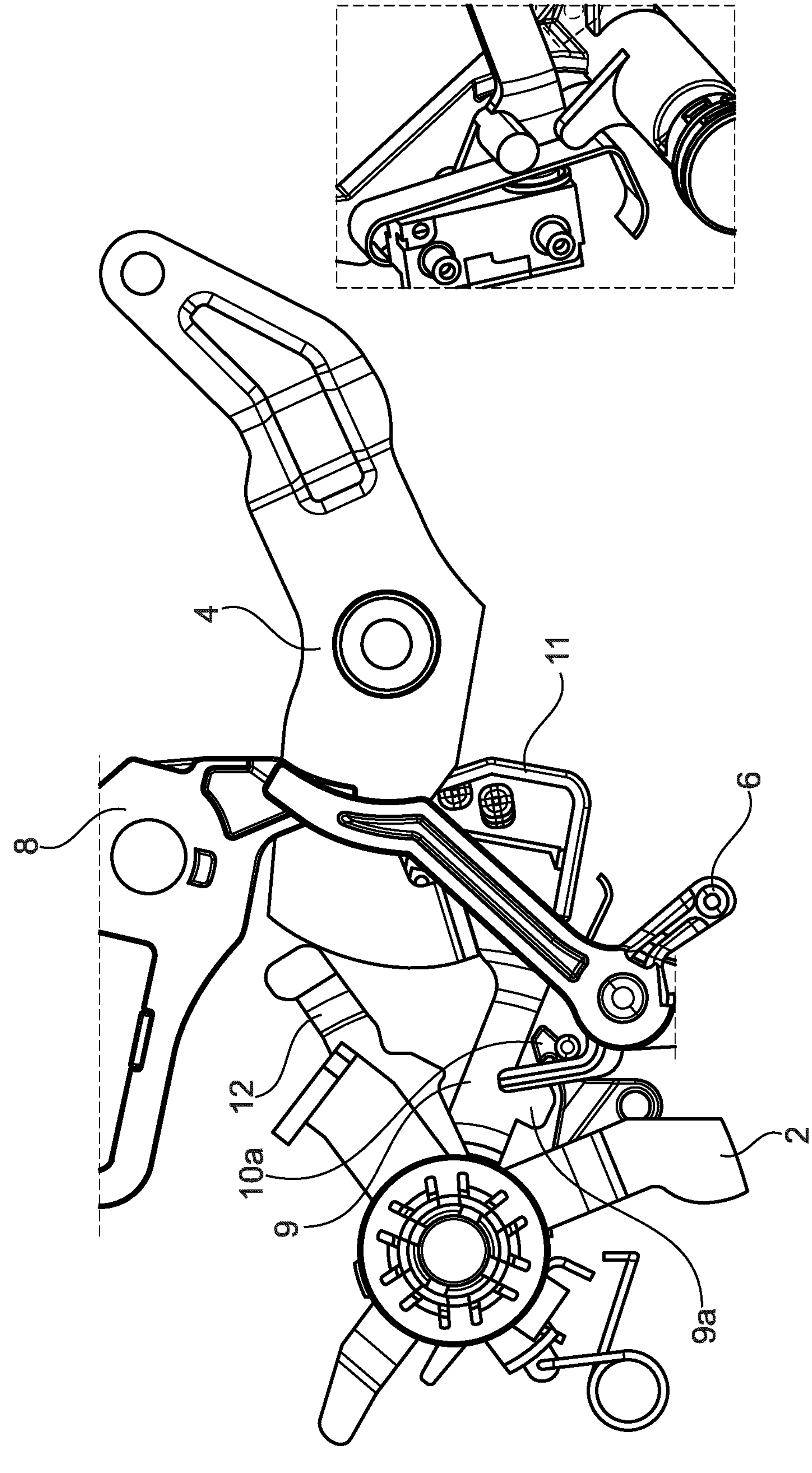
Figure 5:
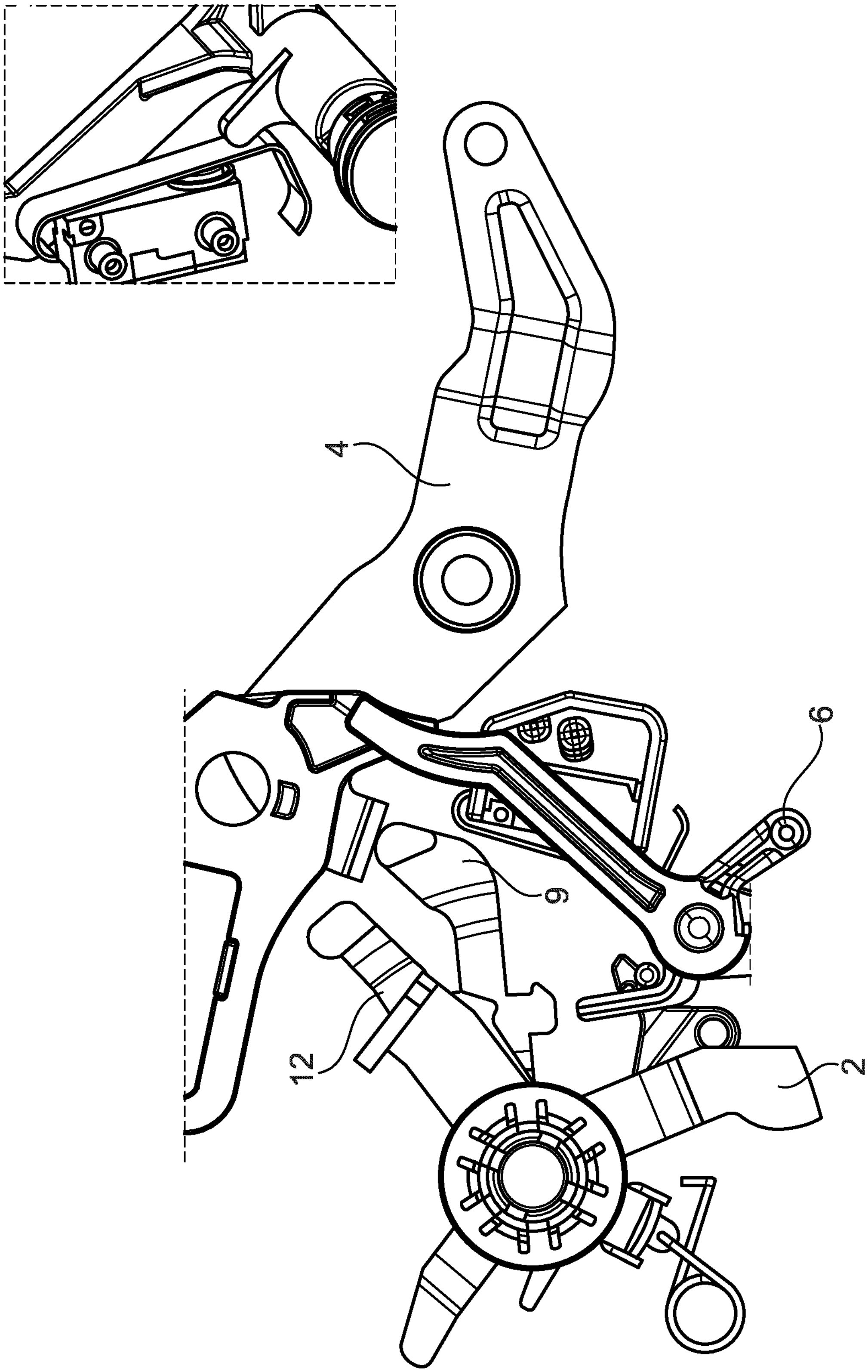
Figure 6:
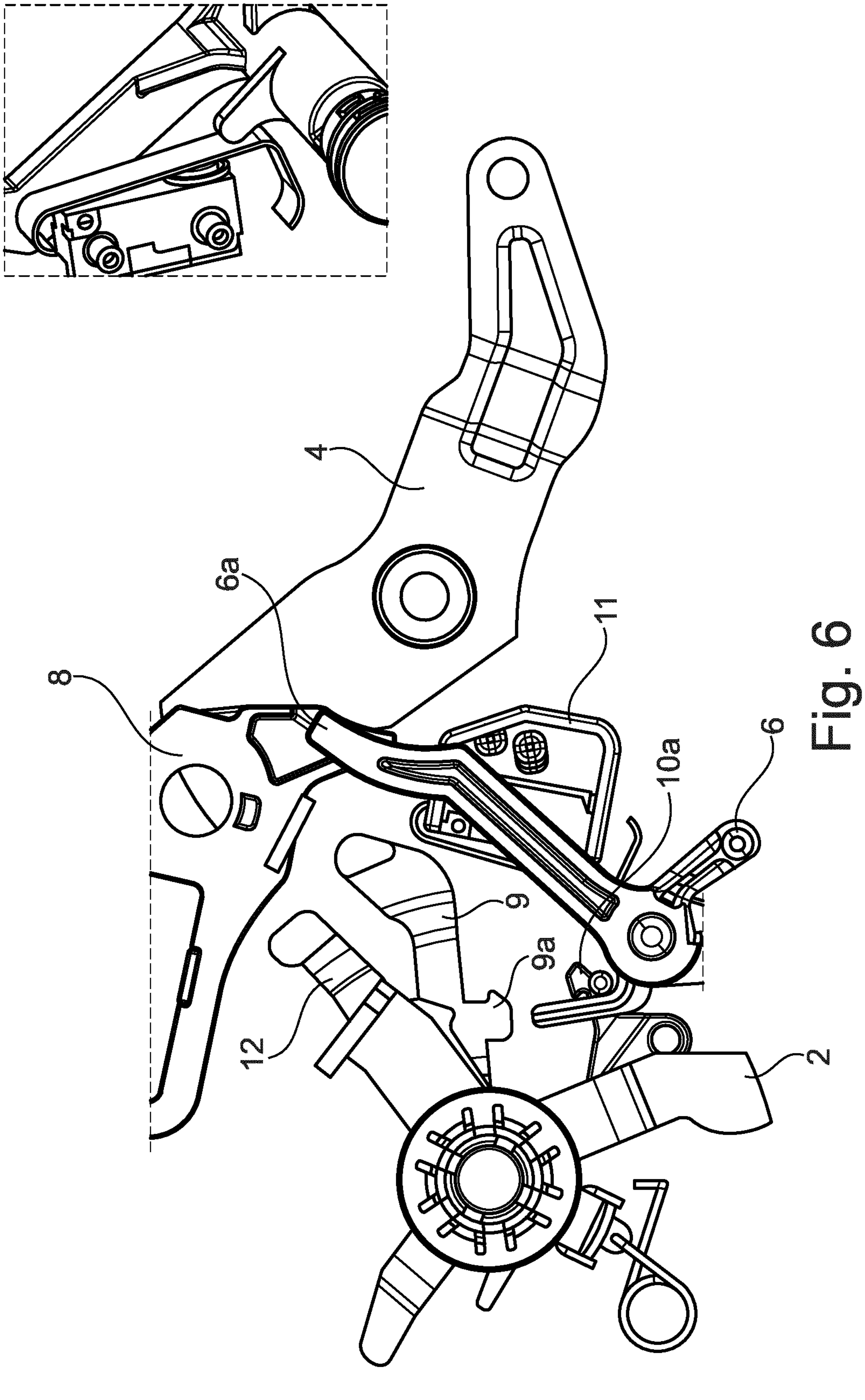
Figure 7:
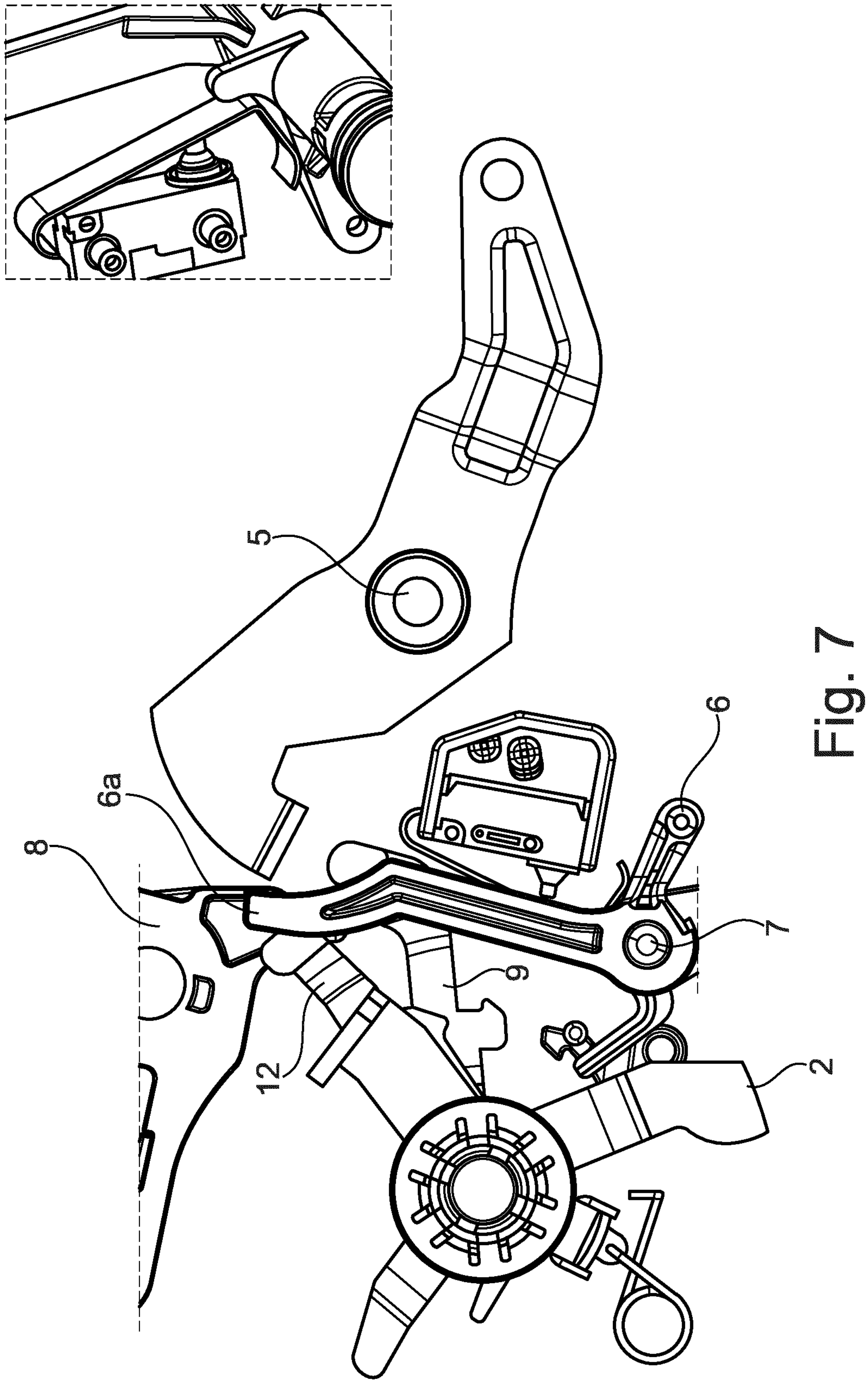

As a result of this, if the actuating lever 4 is no longer acted upon during the transition from FIG. 4 to FIG. 5 and consequently the actuating lever 4 moves back (usually spring-assisted) clockwise about its axis 5, the accumulator lever 9 follows the actuating lever 4 as it moves back, as can be seen from the further progression of the movement from FIG. 5 to FIG. 6. In FIG. 6, the vehicle locking device has assumed its basic rest position comparable to the functional position in FIG. 1, with the only difference being that the safety lever 6 still assumes its "secured" position in the functional position of FIG. 6. In this "secured" position of the locking lever 6, action upon the actuating lever 4 results in an empty movement in relation to the locking mechanism 1. This is therefore not opened.

During the transition from FIG. 6 to FIG. 7, the electromotive drive 8 has now been acted upon in such a way that it performs a linear movement to the left, so that as a result of this, the locking lever 6 is pivoted back counter-clockwise about its axis 7 via the stop contour 6*a* on the locking lever 6 and now resumes its "unlocked" position already assumed in FIG. 1.

Figure 8:
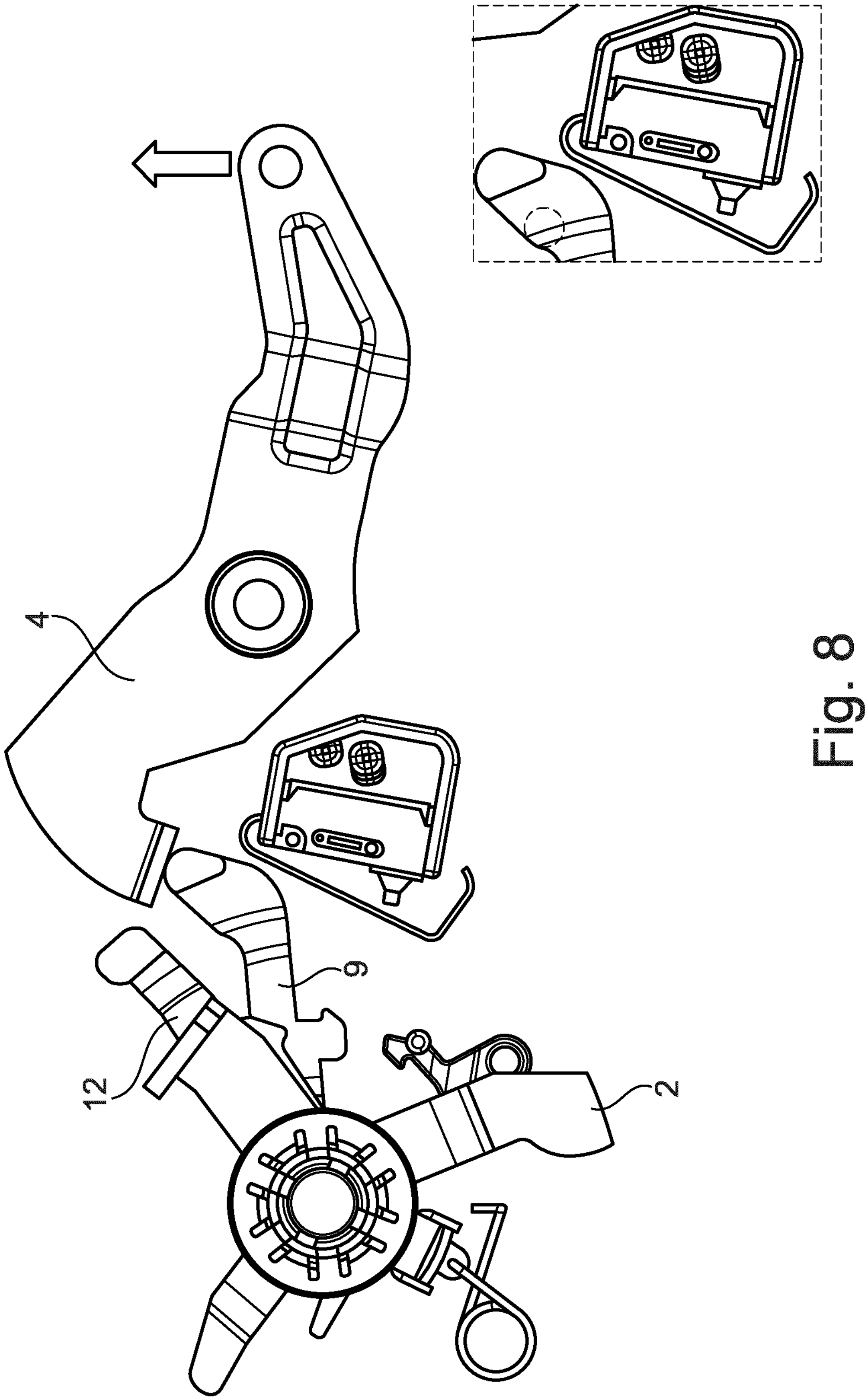
Figure 9:
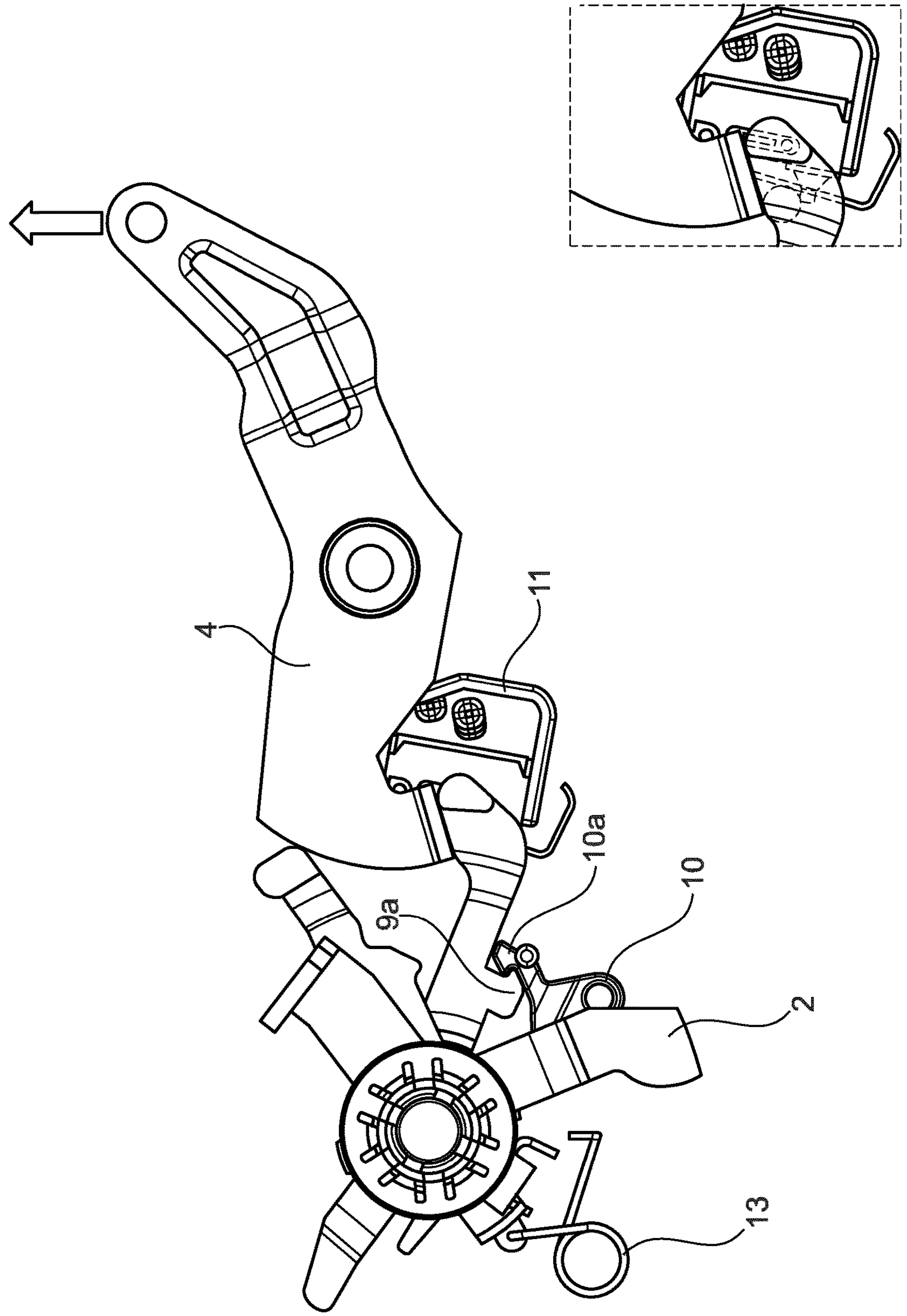

If now, starting from the "unlocked" position of the safety lever 6 according to FIG. 7, the actuating lever 4 is again subjected to a first stroke in such a way that the actuating lever 4 performs the previously described counterclockwise movement about its axis 5, then during the transition from FIG. 7 to FIG. 8 and on to FIG. 9, the accumulator lever 9 in the functional position of FIG. 9 is transferred to the storage position already mentioned. In this storage position, the two latching contours 9*a*, 10*a* engage with each other on the latching element 10 on the one hand and on the accumulator lever 9 on the other. As a result, the accumulator lever 9 is held in its functional position as shown in FIG. 9, even when the action upon the operating lever 4 ends.

Figure 10:
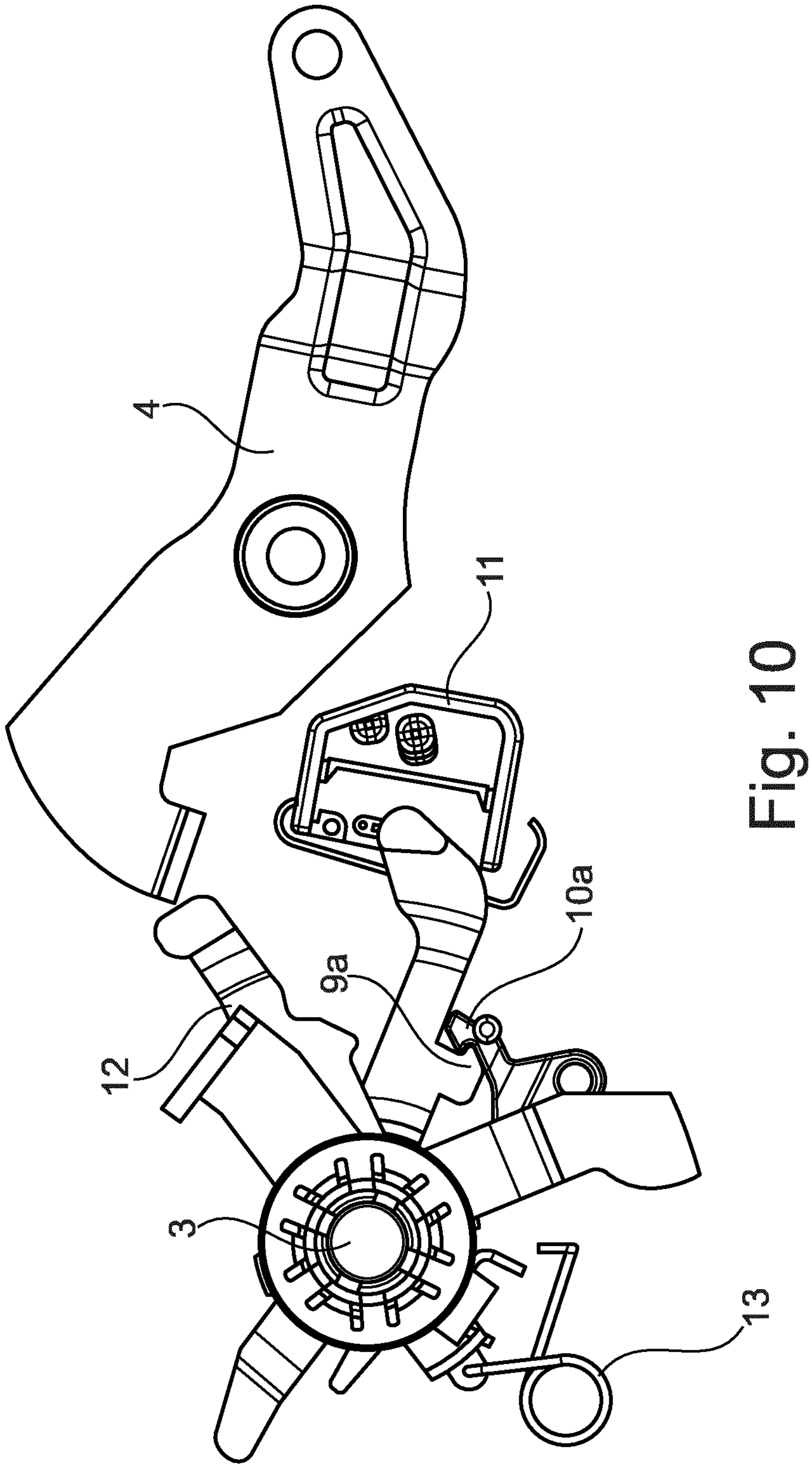

This corresponds to the actuating lever 4 (spring-supported) being moved back clockwise around its axis 5 from the position in FIG. 9, as can be seen in the transition to FIG. 10. Since the accumulator lever 9 assumes and retains its storage position unchanged during the transition from FIG. 9 to FIG. 10, the spring 13 coupling the shift lever 12 and the accumulator lever 9 ensures that the shift lever 12 follows the accumulator lever 9, so to speak. This becomes clear in the transition from FIG. 10 to FIG. 11. This tracking of the shift lever 12 in relation to the accumulator lever 9 results in the shift lever 12 being pivoted clockwise about the common axis 3 with the aid of the spring 13, as can be seen in the transition from FIG. 10 to FIG. 11. This brings the shift lever 12 into the engagement range of the operating lever 4.

Figure 11:
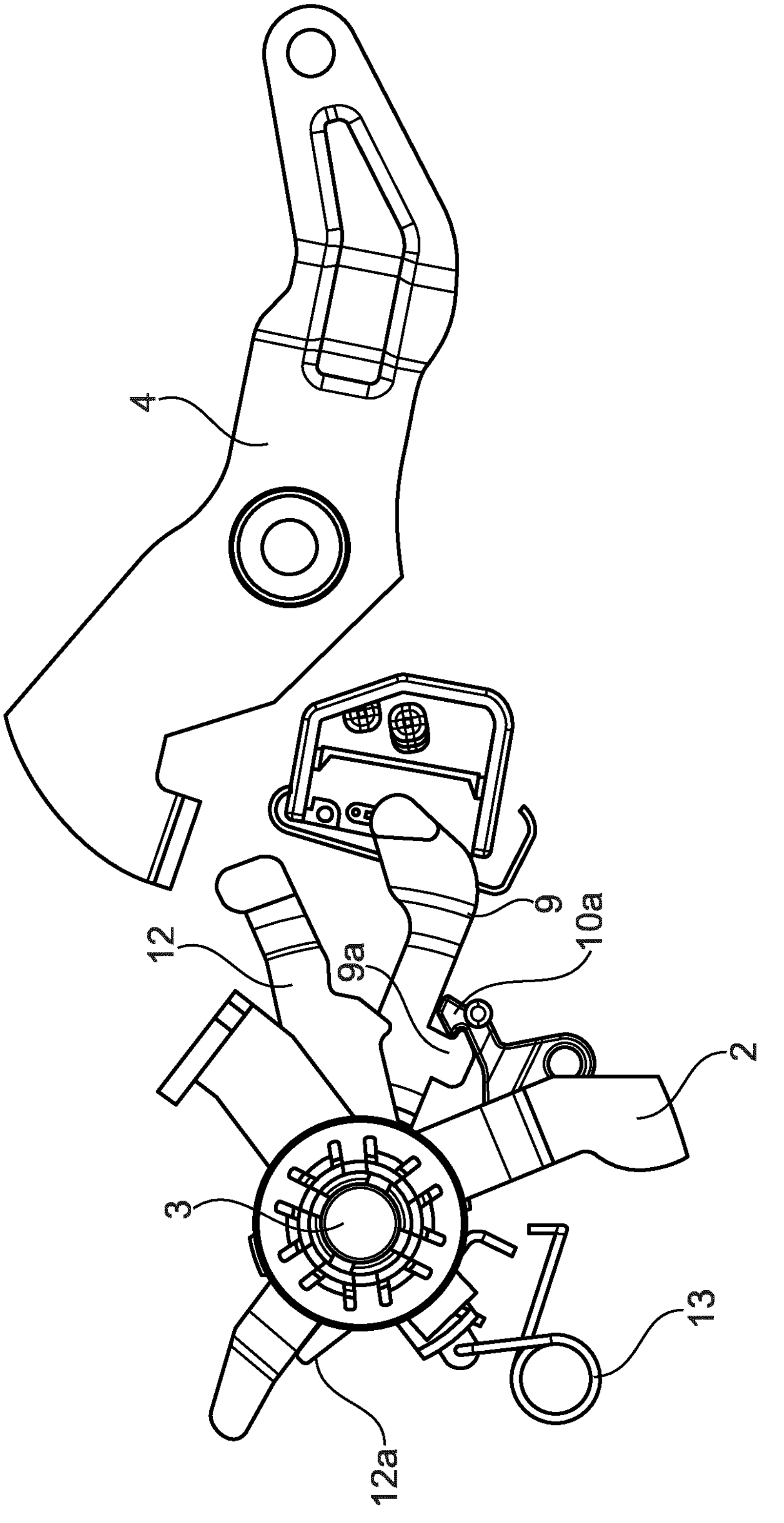
Figure 12:
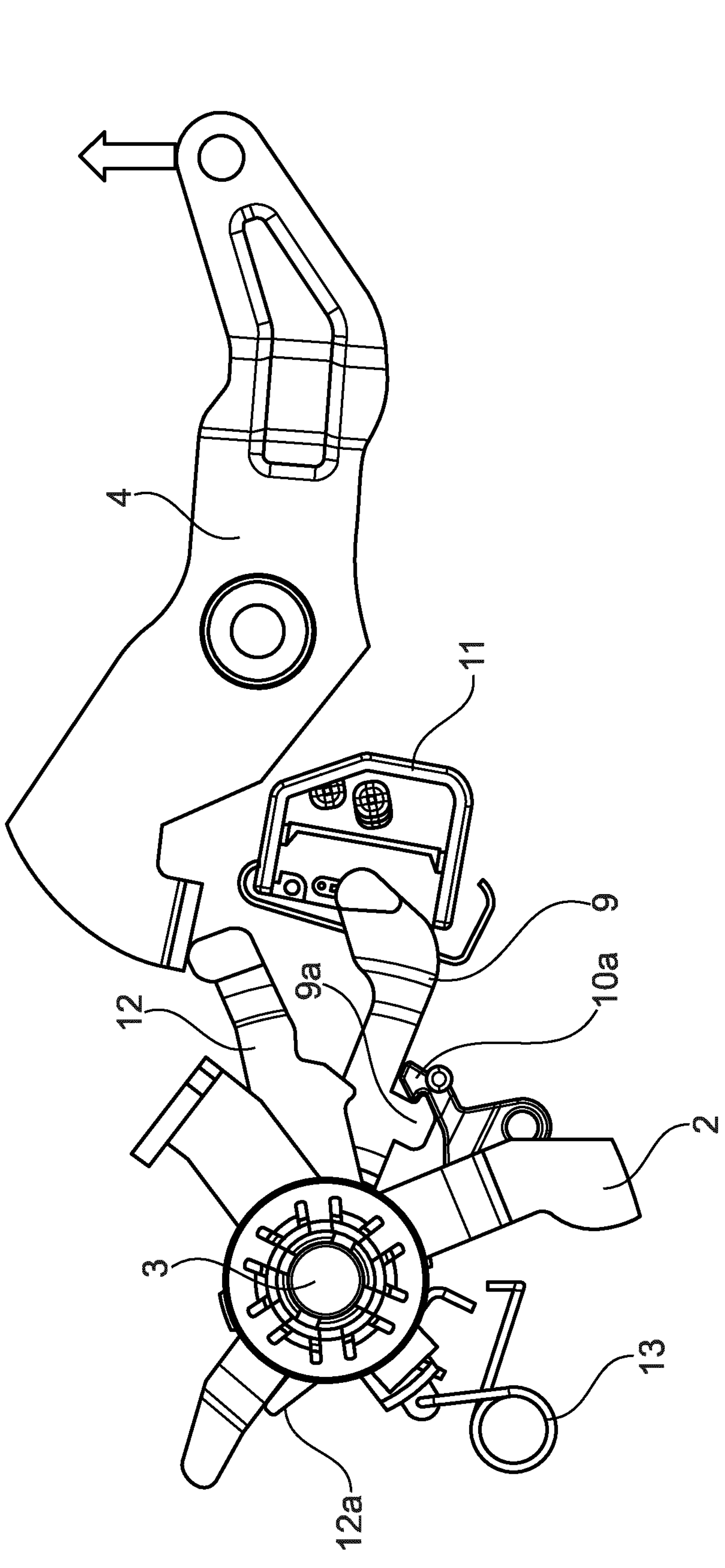
Figure 13:
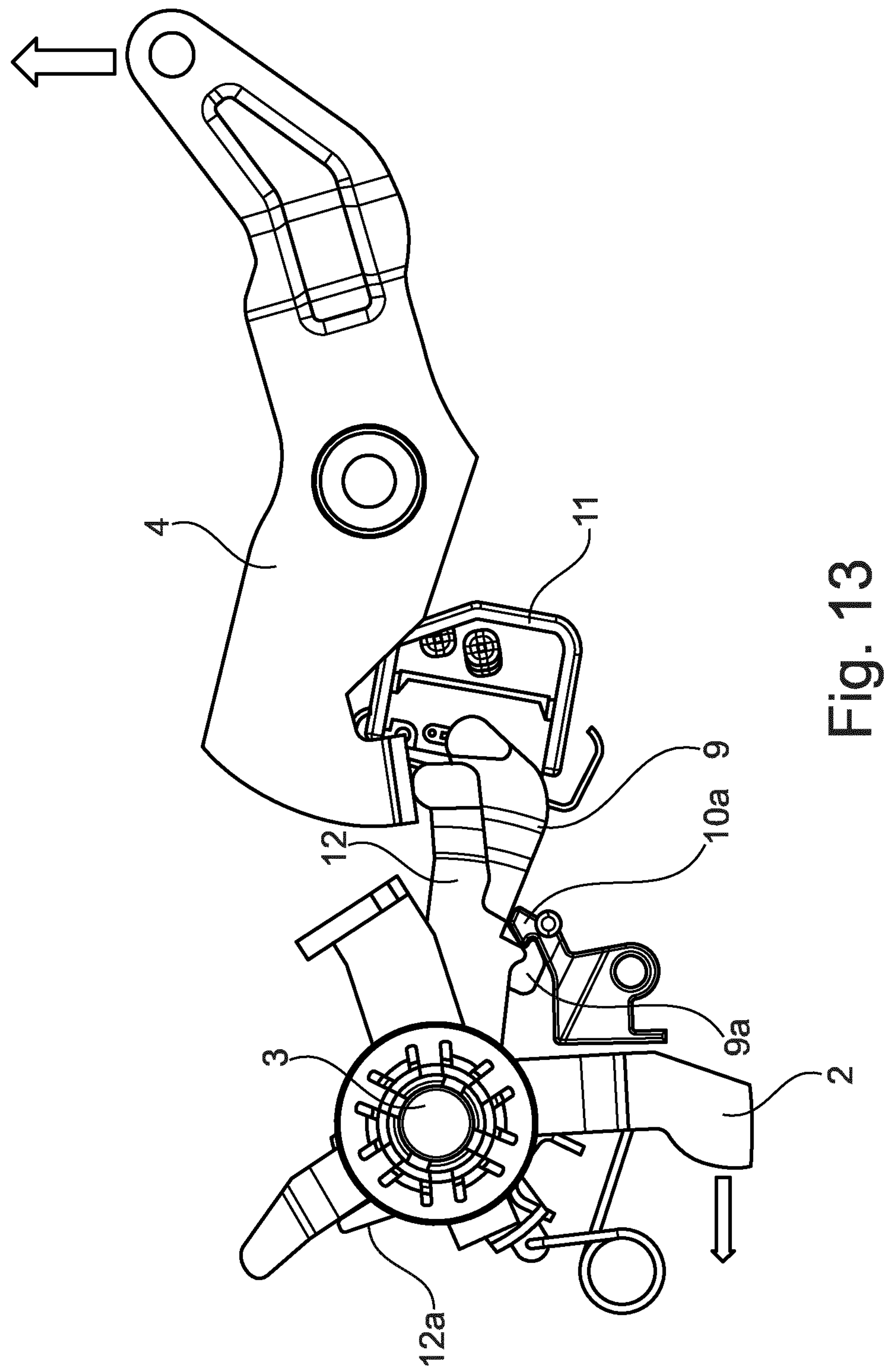

If, starting from the functional position shown in FIG. 11, the actuating lever 4 is now acted upon with a second stroke about its axis 5 in an anticlockwise direction, it can be seen at the transition from FIG. 11 to FIG. 12 that the actuating lever 4 can interact with the shift lever 12. The interaction of the actuating lever 4 with the shift lever 12 during the transition from FIG. 12 to FIG. 13 now results in the shift lever 12 being pivoted clockwise about its axis 3 and the stop contour 12*a* on the shift lever 12 working on the release lever 2 and entraining it with respect to the clockwise movement of the shift lever 12 about the common axis 3. This process can be seen in the transition from FIG. 12 to FIG. 13.

The clockwise movement of the release lever 2 around the axis 3 now has the effect that during the further transition from FIG. 12 via FIG. 13 to FIG. 14, the locking mechanism 1 is acted upon and opened with the aid of the release lever 2, as already described above.

At the same time, during this process and at the end of the second stroke of the actuating lever 4, during the transition from FIG. 13 to FIG. 14, the shift lever 12 is not only acted upon with the aid of the actuating lever 4, but also the accumulator lever 9. As a result, at the end of this two-stroke action upon, the accumulator lever 9 is released from the latching element 10 by applying pressure to the accumulator lever 9. If the actuating lever 4 is now released and returns (spring-loaded) to its starting position based on the illustration in FIG. 14 and after the two-stroke action upon the actuating lever 4, this results in the functional position according to FIG. 7 being reached again based on the illustration in FIG. 14 and thus the starting position before the two-stroke action upon or the rest position, namely with the safety lever 6 still in its "unlocked" position.

The further and already mentioned stop contour 12*b* on the shift lever 12 may further ensure that the latching contours 9*a*, 10*a* are released from each other. This is because a (spring-assisted) reset of the release lever 2 from the open position of the locking mechanism 1 as shown in FIG. 14 results in a counter-clockwise rotation of the release lever 2 about the axis 3. The stop contour 12*b* may be used to move the shift lever 12 and thus also the accumulator lever 9. The locking contours 9*a*, 10*a* become detached.

LIST OF REFERENCE NUMBERS

1 Locking mechanism
2 Release lever
3 Axis
4 Actuating lever
2, 4 Coupling arrangement
5 (Rotary) axis
6 Securing lever
6*a* Stop contour
6*b* Driving contour
6*c* Shift contour
7 Axis
8 Electric motor drive
9 Accumulator lever
9*a* Latching contour
10 Ratchet element
10*a* Latching contour
11 Switch
12 Shift lever
12*a* Stop contour
13 Spring

The invention claimed is:

1. A motor vehicle door locking device comprising:

a clutch arrangement including an actuating lever and a release lever which are coupled to each other in a releasable manner, wherein the release lever acts on a locking mechanism of the locking device to unlock the locking mechanism, a safety lever movable between a first position and a second position, wherein the actuating lever and the release lever, starting from a disengaged basic position in which the actuating lever and the release lever separated, become coupled to one another by a two-stroke actuation of the actuating lever when the safety lever is in the second position, an accumulator lever engage by the actuating lever during a first stroke of the two-stroke actuation of the actuating lever, wherein when the safety lever is in the second position the accumulator lever is held in a storage position after the first stroke so that the actuating lever acts upon the release lever during a second stroke of the two-stroke actuation, and wherein when the safety lever is in the first position, the actuating lever is spaced from the release lever to prevents a subsequent movement of the release lever during the second stroke of the actuating lever.

2. The motor vehicle door locking device according to claim 1, further comprising a latching element, wherein the safety lever interacts with the latching element to releasably hold the accumulator lever in the storage position.

3. The motor vehicle door locking device according to claim 2, wherein the safety lever has a driving contour for acting on the latching element.

4. The motor vehicle door locking device according to claim 3, wherein the safety lever transfers the latching element via the driving contour between a latching position for reasonably holding the accumulator lever in the storage position and a release position preventing the storage position.

5. The motor vehicle door locking device according to claim 1, wherein the safety lever has a stop contour for interaction with a handle and/or an electromotive drive.

6. The motor vehicle door locking device according to claim 1, further comprising a sensor which senses a position of the safety lever.

7. The motor vehicle door locking device according to claim 1, further comprising a shift lever coupled between the accumulator lever and the release lever.

8. The motor vehicle door locking device according to claim 7, wherein the shift lever is coupled to the accumulator lever via a spring.

9. The motor vehicle door locking device according to claim 7, wherein the shift lever has at least one stop contour interacting with the release lever.

10. The motor vehicle door locking device according to claim 7, wherein the shift lever, the accumulator lever and the release lever are rotatably mounted on a same axis as one another.

11. The motor vehicle door locking device according to claim 6, wherein the sensor comprises a switch that is acted upon by a contour of the safety lever.

12. The motor vehicle door locking device according to claim 2, wherein the accumulator lever and the latching element have interlocking elements that interact in the storage position.

13. The motor vehicle door locking device according to claim 7, wherein the shift lever includes a stop contour that comes into engagement with the release lever.

* * * * *